(12) United States Patent
Lewis et al.

(10) Patent No.: US 7,347,434 B2
(45) Date of Patent: Mar. 25, 2008

(54) FOUR-WHEEL STEERING ASSEMBLY

(75) Inventors: Brian J. Lewis, West Chester, OH (US); Gregory M. McKnight, Cincinnati, OH (US); Charles R. Aveline, Jr., Greensboro, NC (US); Bradley J. Mouser, Spring Hill, TN (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 377 days.

(21) Appl. No.: 11/184,127

(22) Filed: Jul. 19, 2005

(65) Prior Publication Data

US 2006/0017249 A1    Jan. 26, 2006

Related U.S. Application Data

(60) Provisional application No. 60/589,016, filed on Jul. 20, 2004.

(51) Int. Cl.
*B62D 7/14* (2006.01)
*B62D 7/00* (2006.01)

(52) U.S. Cl. .................. 280/99; 280/93.502; 280/91.1; 180/409

(58) Field of Classification Search .............. 280/91.1, 280/99, 93.502, 100, 93.506, 93.51; 180/409, 180/234, 79.3, 900, 908; 446/460, 468
See application file for complete search history.

(56) References Cited

U.S. PATENT DOCUMENTS

| | | | | |
|---|---|---|---|---|
| 1,228,980 A | * | 6/1917 | Smith | 280/100 |
| 1,381,327 A | * | 6/1921 | Miller | 280/99 |
| 1,951,147 A | * | 3/1934 | Greist | 180/409 |
| 3,596,730 A | * | 8/1971 | Cecce | 180/236 |
| 4,738,459 A | | 4/1988 | Nakamura et al. | |
| 4,798,393 A | * | 1/1989 | Miura et al. | 180/409 |
| 5,048,853 A | | 9/1991 | Trefz et al. | |
| 5,288,091 A | | 2/1994 | Deschamps | |
| 5,531,466 A | * | 7/1996 | Hayashi | 280/91.1 |
| 5,667,032 A | * | 9/1997 | Kamlukin | 180/256 |
| 6,131,689 A | | 10/2000 | Nodorft et al. | |

* cited by examiner

*Primary Examiner*—Joe H. Cheng
*Assistant Examiner*—Nicole Verley
(74) *Attorney, Agent, or Firm*—Michael Best & Friedrich LLP

(57) ABSTRACT

A steering assembly for a vehicle includes a forward apparatus positioned toward the front of the vehicle and having a first front wheel assembly and a second front wheel assembly. The steering assembly includes a gear having teeth and being pivotable about a pivot axis. The pivot axis is positioned between the teeth of the gear and the forward apparatus. A first front link is attached to the gear and to the first front wheel assembly to turn a first front wheel. A second front link is attached to the gear and to the second front wheel assembly to turn a second front wheel.

20 Claims, 7 Drawing Sheets

FOUR-WHEEL STEERING ASSEMBLY

RELATED APPLICATION DATA

This application claims benefit under 35 U.S.C. Section 119(e) of co-pending U.S. Provisional Application Ser. No. 60/589,016 filed Jul. 20, 2004, which is fully incorporated herein by reference.

FIELD OF THE INVENTION

The present invention relates to four-wheel steering assemblies for vehicles. In particular, the present invention relates to four-wheel steering assemblies for lawn mowers.

BACKGROUND OF THE INVENTION

Four-wheel steering assemblies for vehicles are generally shown in U.S. Pat. Nos. 4,738,459, 5,048,853, 5,288,091, and 6,131,689, which are incorporated herein by reference thereto, respectively. The present invention provides improvements over known steering assemblies.

SUMMARY OF THE INVENTION

One aspect of the invention relates to a steering assembly for a vehicle. The steering assembly includes a forward apparatus positioned toward the front of the vehicle and having a first front wheel assembly and a second front wheel assembly. The steering assembly includes a gear having teeth and being pivotable about a pivot axis. The pivot axis is positioned between the teeth of the gear and the forward apparatus. A first front link is attached to the gear and to the first front wheel assembly to turn a first front wheel. A second front link is attached to the gear and to the second front wheel assembly to turn a second front wheel.

Another aspect of the invention relates to a four-wheel steering assembly for a vehicle. The four-wheel steering assembly includes a forward apparatus positioned toward the front of the vehicle and having a first front wheel assembly and a second front wheel assembly. A rearward apparatus is positioned toward the rear of the vehicle and has a first rear wheel assembly and a second rear wheel assembly. A sector gear is positioned between the forward and rearward apparatus. The sector gear has teeth on one side of the gear and a pivot axis located on another side of the gear that is opposite to the one side of the gear. The sector gear is pivotable about the pivot axis. The pivot axis is positioned between the teeth of the sector gear and the forward apparatus. A first front link is attached to the sector gear and to the first front wheel assembly to turn a first front wheel. A second front link is attached to the sector gear and to the second front wheel assembly to turn a second front wheel. A rear steering link is coupled between the sector gear and the rearward apparatus to turn a first rear wheel and a second rear wheel.

Still another aspect of the invention relates to a steering assembly for a vehicle. The steering assembly includes a forward apparatus positioned toward the front of the vehicle and having a first front wheel and a second front wheel. A rearward apparatus is positioned toward the rear of the vehicle and has a first rear wheel and a second rear wheel. The steering assembly includes means for connecting the forward and rearward apparatus, for steering the first and second front wheels, and for steering the first and second rear wheels in a manner that corresponds to the steering of the first and second front wheels.

Still another aspect of the invention relates to a four-wheel steering assembly for a vehicle. The four-wheel steering assembly includes a forward apparatus positioned toward the front of the vehicle and having a first front wheel assembly and a second front wheel assembly. A rearward apparatus is positioned toward the rear of the vehicle and has a first rear wheel assembly and a second rear wheel assembly. A sector gear is positioned between the forward and rearward apparatus. The sector gear has teeth on one side of the gear and a pivot axis located on another side of the gear that is opposite to the one side of the gear. The sector gear is pivotable about the pivot axis. A first front link is attached to the sector gear and to the forward apparatus. A rear steering link is coupled between the sector gear and the rearward apparatus to turn a first rear wheel and a second rear wheel. A bracket is rigidly attached to a frame of the vehicle and is positioned between the rearward apparatus and the sector gear. A rear pivot lever is mounted on the bracket and is coupled to the rear steering link and to the first and second rear wheel assemblies to turn the first rear wheel and the second rear wheel.

Yet another aspect of the invention relates to a four-wheel steering assembly for a vehicle. The four-wheel steering assembly includes a forward apparatus positioned toward the front of the vehicle and having a first front wheel assembly and a second front wheel assembly. A rearward apparatus is positioned toward the rear of the vehicle and has a first rear wheel assembly and a second rear wheel assembly. A gear is positioned between the forward and rearward apparatuses. The gear has teeth and is pivotable about a pivot axis. The teeth are positioned between the pivot axis of the gear and the rearward apparatus. A first front link is attached to the gear and to the forward apparatus. A rear steering link is coupled between the gear and the rearward apparatus to turn a first rear wheel and a second rear wheel. The four-wheel steering assembly also includes a rear transaxle. A first rear pivot bracket is rigidly attached to a frame of the vehicle and the rear transaxle, and a second rear pivot bracket is rigidly attached to the frame of the vehicle and the rear transaxle. The first and second rear pivot brackets are structured to pivotally support (1) respective pivot assemblies associated with the first and second rear wheel assemblies, and (2) respective steering arms associated with the rear steering link.

These and other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

Figure 1:
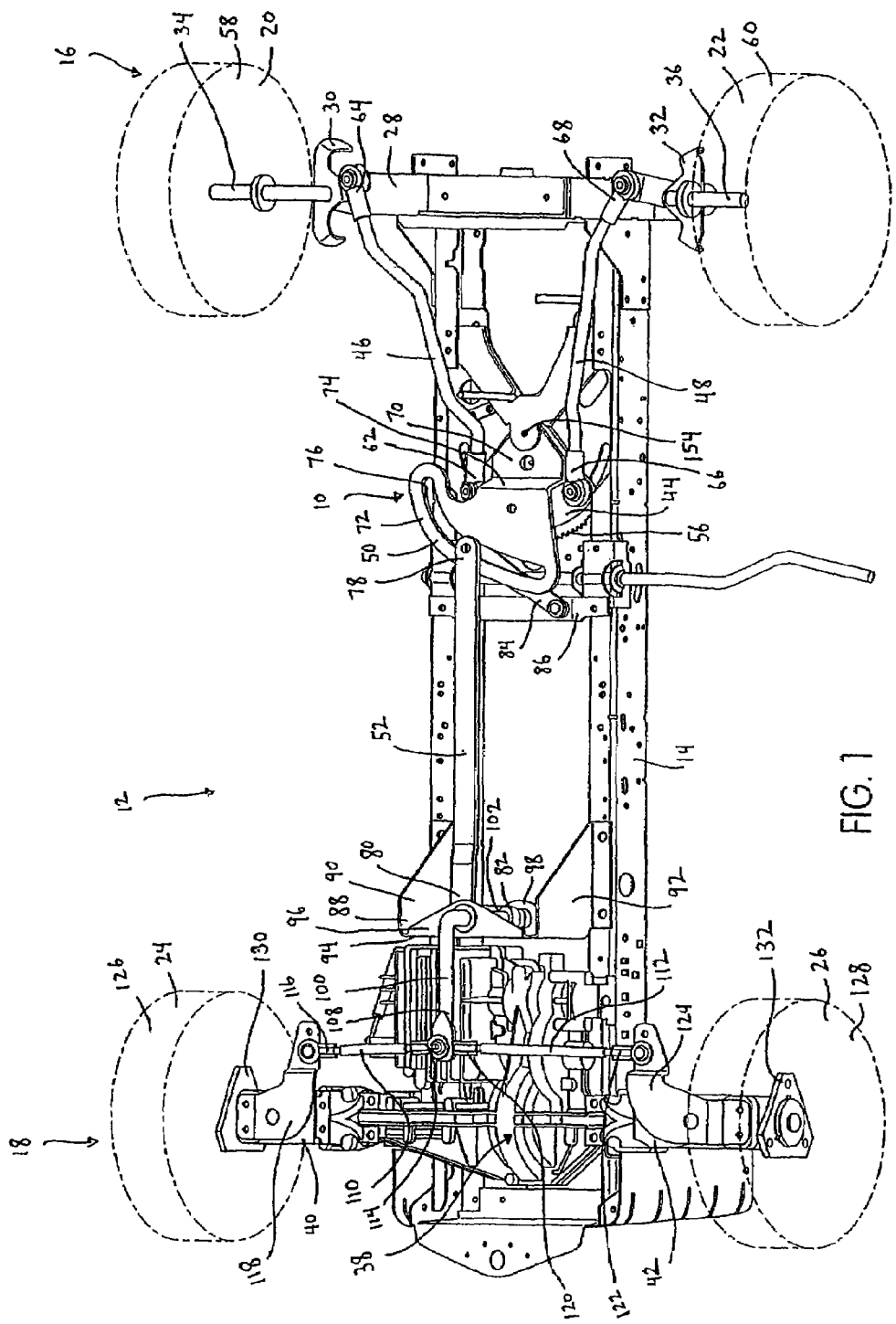
FIG. 1 is a bottom perspective view of a four-wheel steering assembly constructed in accordance with an embodiment of the invention, the four-wheel steering assembly mounted to an embodiment of a vehicle frame.

FIG. 1 illustrates a four-wheel steering assembly 10 for a vehicle 12. The steering assembly 10 is mounted to a frame 14 of the vehicle 12 and controls turning or steering of all four wheels of the vehicle 12. The steering assembly 10 illustrated is particularly adapted for use on a riding lawn mower, e.g., a lawn tractor or a garden tractor. However, the steering assembly 10 may be adapted for use on any other suitable wheeled vehicle. FIG. 1 illustrates a steering assembly 10 that is constructed to decrease the turning radius of the vehicle and to increase maneuverability. Thus, when the steering assembly 10 is adapted for use as a riding lawn mower, the steering assembly 10 permits grass to be cut more efficiently and quickly since decreased turning radius and increased maneuverability results in fewer turns, fewer stops, and fewer times moving in reverse. Also, the steering assembly 10 would permit a riding lawn mower to turn away from obstacles by allowing the front wheels to turn before the rear wheels start to turn.

The vehicle 12 has some similarities to the vehicle disclosed in U.S. Pat. No. 5,048,853, which has been incorporated herein by reference. Vehicle 12, however, includes the improvements as outlined herein.

As illustrated, the steering assembly 10 includes a forward apparatus 16 positioned toward the front of the vehicle 12, and a rearward apparatus 18 positioned toward the rear of the vehicle 12. The forward apparatus 16 has a first front wheel assembly 20 and a second front wheel assembly 22. The rearward apparatus 18 has a first rear wheel assembly 24 and a second rear wheel assembly 26.

A front cross-member 28 is mounted to the frame 14 and extends between and connects together the first and second front wheel assemblies 20, 22. A first front steering arm 30 is pivotally mounted to one end of the front cross-member 28, and a second front steering arm 32 is pivotally mounted to the opposite end of the front cross-member 28. The steering arms 30, 32 are operatively connected to front wheel axles 34, 36 structured to mount respective front wheel assemblies 20, 22.

A rear transaxle 38 is mounted to the frame 14 and extends between and connects together the first and second rear wheel assemblies 24, 26. As will be discussed in greater detail below, a first rear pivot bracket 40 is rigidly attached to one side of the rear transaxle 38 and the frame 14, and a second rear pivot bracket 42 is rigidly attached to the other side of the rear transaxle 38 and the frame 14. The rear pivot brackets 40, 42 are structured to pivotally support respective pivot assemblies structured to mount respective rear wheel assemblies 24, 26. Axle shafts of the rear transaxle 38 operatively engage respective pivot assemblies supported by the rear pivot brackets 40, 42. In use, rotation of the axle shafts of the rear transaxle 38 causes rotation of the rear wheel assemblies 24, 26 via the pivot assemblies.

It should be understood that the arrangement of the front and rear wheel assemblies 20, 22, 24, 26 is exemplary and the steering assembly 10 described below may be incorporated into any other suitable wheel assembly.

Figure 2:
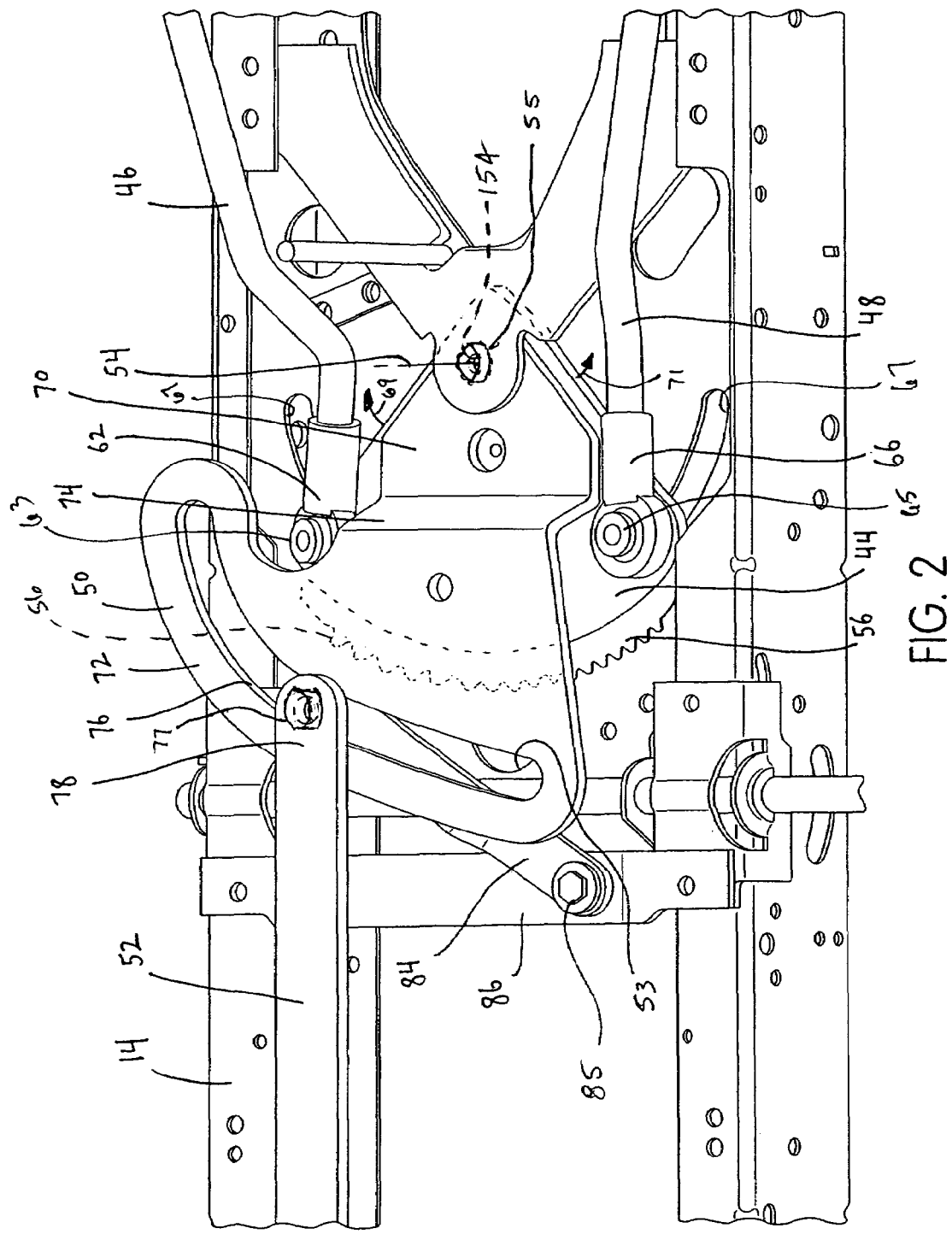
FIG. 2 is an enlarged bottom perspective view of a gear, first and second front links, and a rear steering link of the four-wheel steering assembly shown in FIG. 1.

As best shown in FIGS. 1 and 2, the steering assembly 10 also includes a gear 44, first and second front links 46, 48, a cam slot bracket 50, and a rear steering link 52. The steering assembly 10 is constructed and arranged to steer front and rear wheels of the front and rear wheel assemblies 20, 22, 24, 26.

In the illustrated embodiment, the gear 44 is a sector gear that is positioned between the forward and rearward apparatuses 16, 18. The gear 44 is pivotally mounted to the undercarriage of the vehicle frame 14 for pivotal movement about a pivot axis 54 that is concentric with opening 154 in sector gear 44. The element coupling the gear 44 to the frame 14 and providing the pivot for gear 44 is shown as a pivot 55, but it is understood that a pivot pin as generally know in the art can be employed in opening 154 to provide the element that secures the gear 44 and around which the gear 44 pivots. The gear 44 has teeth 56 on one side thereof, and the pivot axis 54 is located on another side of the gear 44 that is opposite to the one side of the gear 44 with teeth 56. The gear 44 is mounted such that the teeth 56 are positioned between the pivot axis 54 of the gear 44 and the rearward apparatus 18.

As is generally known in the art, the teeth 56 of the gear 44 engage a pinion gear (not shown) that extend through opening 53 and is associated with the steering wheel of the vehicle 12 such that turning of the steering wheel turns the pinion gear and causes pivotal movement of the gear 44 about the pivot axis 54. The movement of the gear 44 can be controlled by a slot or slots 67. Coupling members 63 and 65 attaching the links 46 and 48 to the gear 44 may include extensions that extend down into the slots 67, respectively, and that can move within the slot or slots 67 as the gear 44 moves laterally about axis 54. As a coupling member 63 and 65 abuts against the end of a slot 67, movement of the gear 44 would stop. As the pinion gear rotates, it causes the gear 44 to move. As the pinion gear rotates in one direction, the gear 44 rotates about axis 54 in the direction indicated by arrow 69 in FIG. 2. As the pinion gear rotates in the opposite direction, the gear 44 rotates about axis 54 in the direction indicated by arrow 71, which is opposite to the direction indicated by arrow 69.

As shown in FIG. 1, the first front link 46 is attached to the gear 44 and to the first front wheel assembly 20 to turn a first front wheel 58 of the first front wheel assembly 20, and the second front link 48 is attached to the gear 44 and to the second front wheel assembly 22 to turn a second front wheel 60 of the second front wheel assembly 22. Specifically, the first front link 46 has a first end 62 pivotally connected to one side of the gear 44, e.g., by a bearing assembly 63, and a second end 64 pivotally connected to an end of the first front steering arm 30, e.g., by a bearing assembly, associated with the first front wheel assembly 20. Similarly, the second front link 48 has a first end 66 pivotally connected to another side of the gear 44, e.g., by a bearing assembly 65, and a second end 68 pivotally connected to an end of the second front steering arm 32, e.g., by a bearing assembly, associated with the second front wheel assembly 22. In use, pivotal movement of the gear 44 provides positive steering to the first front wheel 58 via the first front link 46, and positive steering to the second front wheel 60 via the second front link 48. That is, as the gear 44 moves in the direction of arrow 69, first front link 46 moves toward first front wheel 58. As the gear moves in the direction of arrow 71, second front link 48 is pulled away from second front wheel 60. Thus, the turning of the front wheels 58 and 60 is dictated by the movement of the gear 44.

The cam slot bracket 50 is coupled to the gear 44. In the illustrated embodiment, the gear 44 and the cam slot bracket 50 are formed separately from one another, and then rigidly connected to one another in any suitable manner, e.g., fasteners or welding. However, it is contemplated that the gear 44 and cam slot bracket 50 may be formed together as a one-piece structure.

The cam slot bracket 50 may be stamped from a piece of sheet metal and then deformed in a conventional manner to provide the cam slot bracket 50 with a mounting portion 70, a rear link engaging portion 72, and a connecting portion 74 that interconnects the mounting and rear link engaging portions 70, 72. The mounting portion 70 is rigidly connected to the gear 44 such that pivotal movement of the gear 44 causes corresponding pivotal movement of the cam slot bracket 50. The rear link engaging portion 72 includes an arcuate slot 76 that is operatively engaged with the rear steering link 52 coupled to the rear wheel assemblies 24, 26. The member coupling the rear steering link 52 and the slot 76 is shown as pivot 77, it is understood that any appropriate, conventional coupling member can be used to couple the two elements while permitting the coupling member to move within and along the slot 76 while pivotally connected to link 52. The arcuate slot 76 has a distinct shape that provides a variable dwell to delay steering of the rear wheel assemblies 24, 26 with respect to steering of the front wheel assemblies 20, 22.

The rear steering link 52 couples the cam slot bracket 50 and the rear wheel assemblies 24, 26. Thus, the link 52 couples the gear 44 and the rear wheel assemblies 24, 26. In the illustrated embodiment, the rear steering link 52 has a cam-guided first end 78 that has an element 77, such as a bearing assembly, that is slidably received within the arcuate slot 76 of the cam slot bracket 50, and a second end 80 pivotally connected to a rear pivot lever 82 by a pivot member 81, such as a bearing assembly. An additional link 84 is pivotally mounted by pivot elements such as bearing assemblies, between the first end 78 of the rear steering link 52 and an intermediate cross-member 86 mounted to the frame 14. At the cross-member 86, link 84 is pivotally coupled by pivot 85. At the rear steering link, link 84 can be coupled to the pivot member 77 extending through slot 76. In use, pivotal movement of the gear 44 in directions 69 and 71 causes the same directional, pivotal movement of the cam slot bracket 50 and the cam slot 76. As cam slot 76 is moved in directions 69 and 71, the pivot member 77 is forced to move along cam slot 76, which, in turn, moves rear steering link 52. As rear steering link 52 is moved and guided by movement of cam slot 76, the movement of rear steering link 52 pivots the rear pivot lever 82 associated with the rear wheel assemblies 24, 26.

Figure 3:
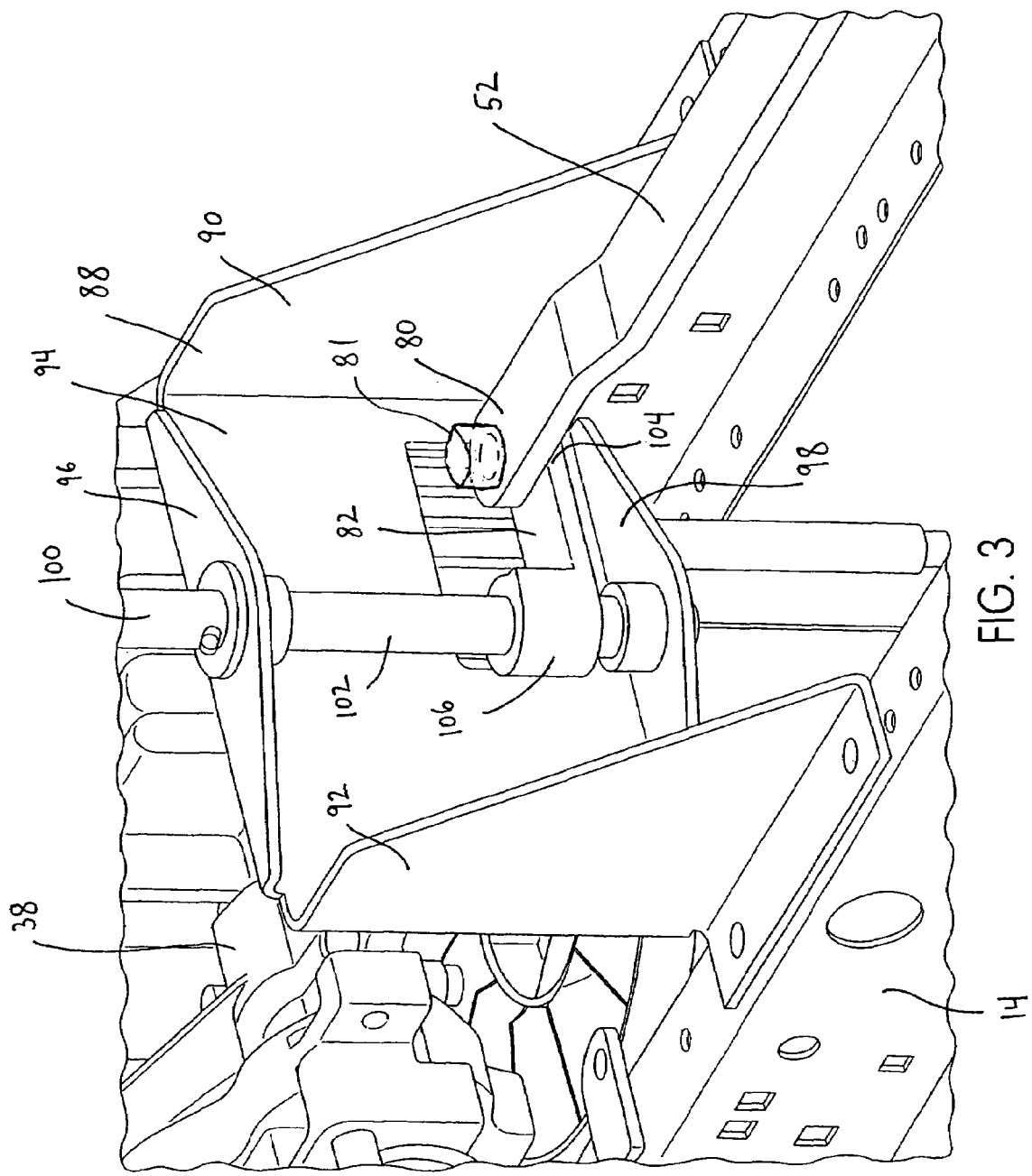
FIG. 3 is an enlarged front-side-bottom perspective view of a bracket attached to the frame of the vehicle and associated with the four-wheel steering assembly shown in FIG. 1.

As best shown in FIG. 3, a bracket 88 is coupled to the frame 14 and is positioned between the rear transaxle 38 and the gear 44. The rear pivot lever 82 is mounted on the bracket 88 and is coupled to the rear steering link 52 via pivot member 81 and to the first and second rear wheel assemblies 24, 26 via shaft 102 to turn rear wheels of the rear wheel assemblies 24, 26.

Specifically, the bracket 88 may be stamped from a piece of sheet metal and then deformed in a conventional manner to provide the bracket 88 with opposing mounting portions 90, 92, a connecting portion 94 that interconnects the mounting portions 90, 92, and upper and lower link engaging portions 96, 98 extending outwardly from the connecting portion 94. The mounting portions 90, 92 are rigidly mounted to opposing side rails of the frame 14, e.g., by fasteners or welding, such that the bracket 88 is spaced forward and separate from the rear transaxle 38.

The upper and lower link engaging portions 96, 98 cooperate to rotatably support an end 102 of an L-shaped rear shaft or link 100, e.g., by upper and lower bearing assemblies. The rear pivot lever 82 has one end 104 pivotally connected to the second end 80 of the rear steering link 52, and an opposite end 106 rigidly connected to the end 102 of the L-shaped rear link 100. As a result, pivotal movement of the rear pivot lever 82 causes corresponding pivotal movement of the L-shaped rear link 100 about the center axis of end 102.

Figure 4:
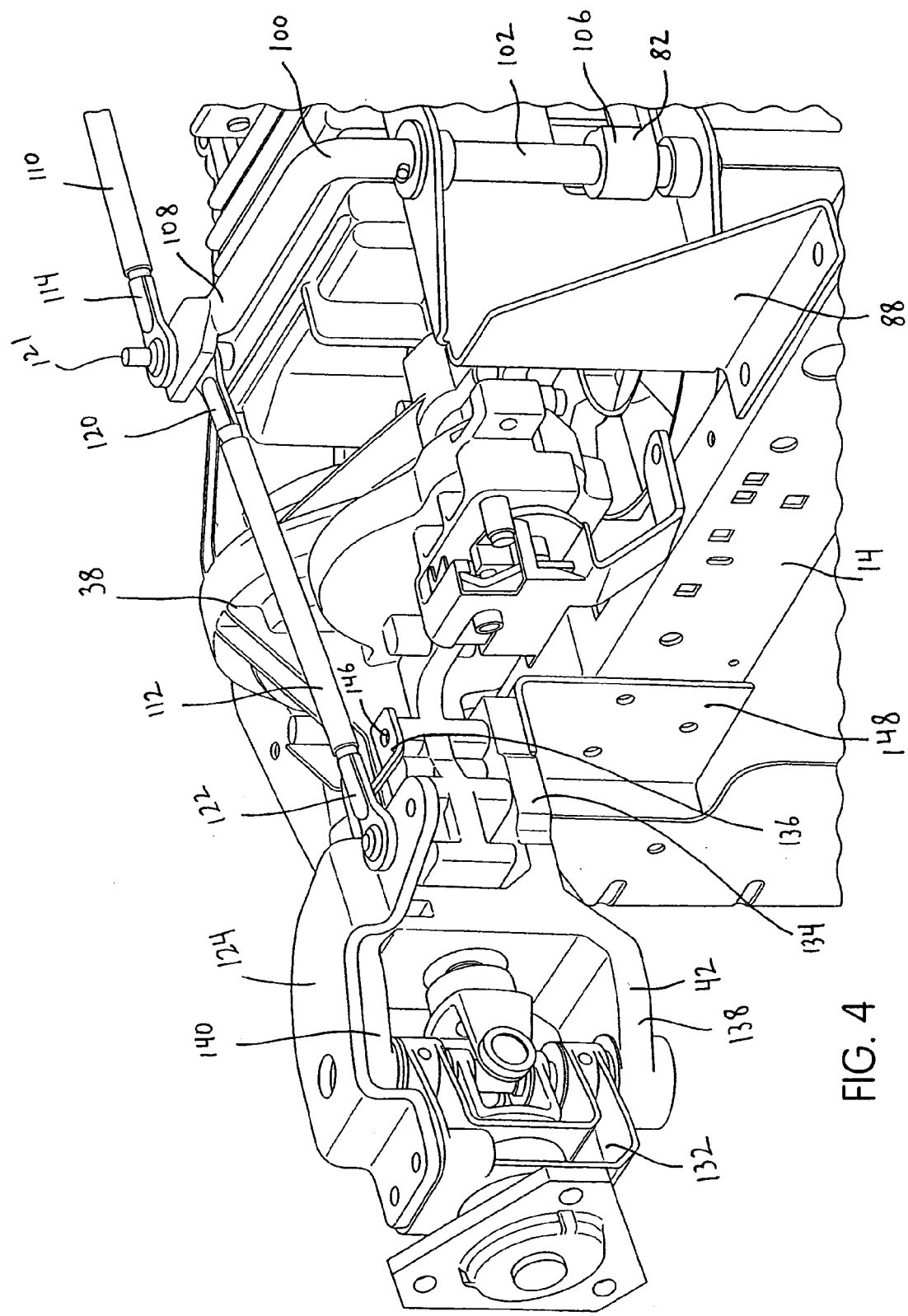
FIG. 4 is a front-side-bottom perspective view of the rear transaxle of the vehicle and a rear pivot bracket associated with the four-wheel steering assembly shown in FIG. 1.

As shown in FIGS. 1 and 4, the opposite end 108 of the L-shaped rear link 100 is pivotally connected to first and second connecting links 110, 112. The first connecting link 110 has a first end 114 pivotally connected to the L-shaped rear link 100 by a pivot member 121, e.g., by a bearing assembly or bolt and bushing assembly, and a second end 116 pivotally connected to an end of a first rear steering arm 118, e.g., by a bearing assembly, associated with the first rear wheel assembly 24. Similarly, the second connecting link 112 has a first end 120 pivotally connected to the L-shaped rear link 100 by pivot member 121 and a second end 122 pivotally connected to an end of a second rear steering arm 124, e.g., by a bearing assembly, associated with the second rear wheel assembly 26. In use, pivotal movement of the L-shaped rear link 100 via the rear steering link 52 provides steering to a first rear wheel 126 of the first rear wheel assembly 24 via the first connecting link 110, and steering to a second rear wheel 128 of the second rear wheel assembly 26 via the second connecting link 112. Thus, movement of the gear 44 controls steering of the front wheels 58 and 60 and steering of the rear wheels 126 and 128. The curvature of the slot 76 helps determine the extent of the steering of the rear wheels 126 and 128 and timing of the rear wheels 126 and 128 relative to the front wheels.

Figure 5:
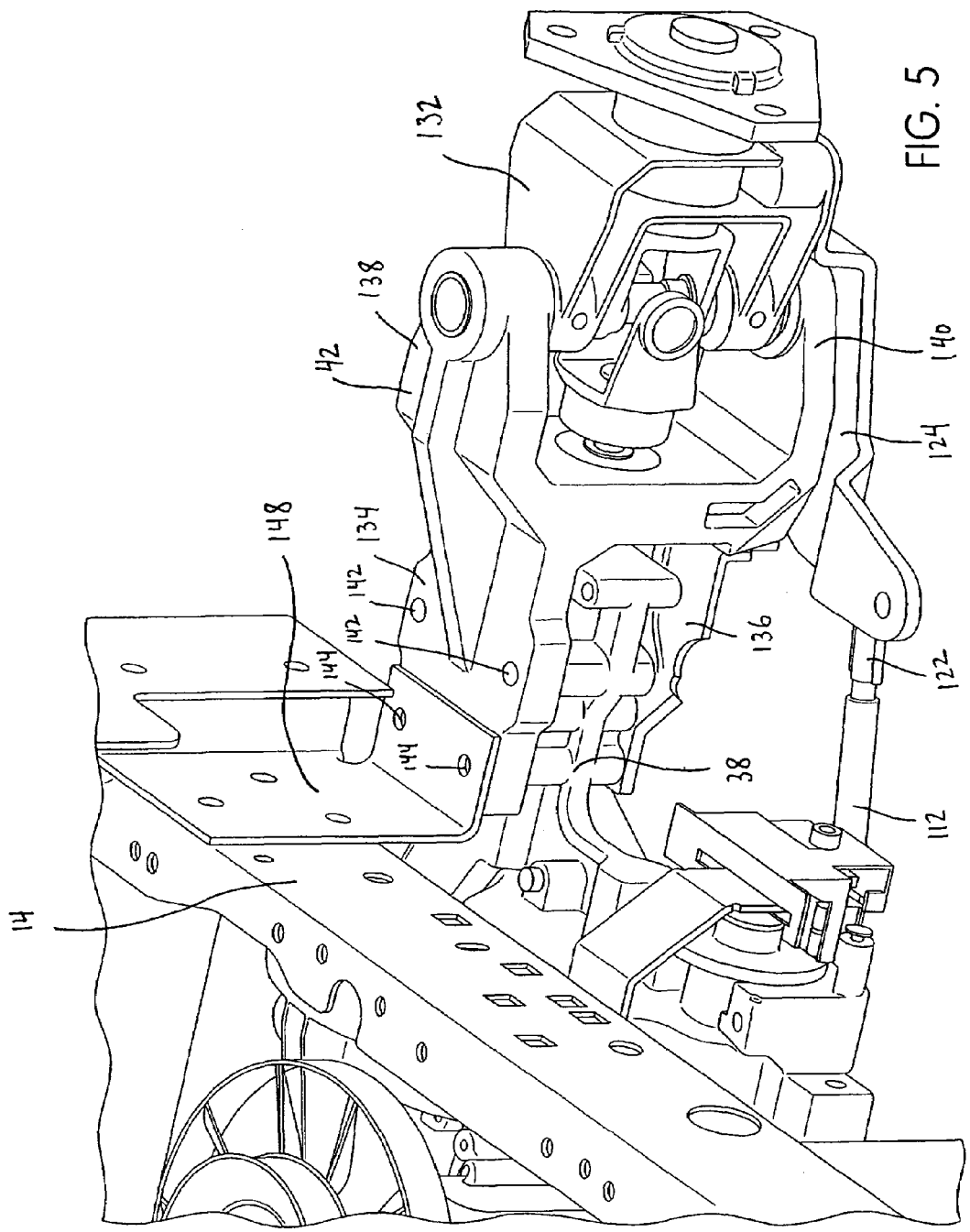
FIG. 5 is an enlarged front-side-top perspective view of the rear pivot bracket shown in FIG. 4.
Figure 6:
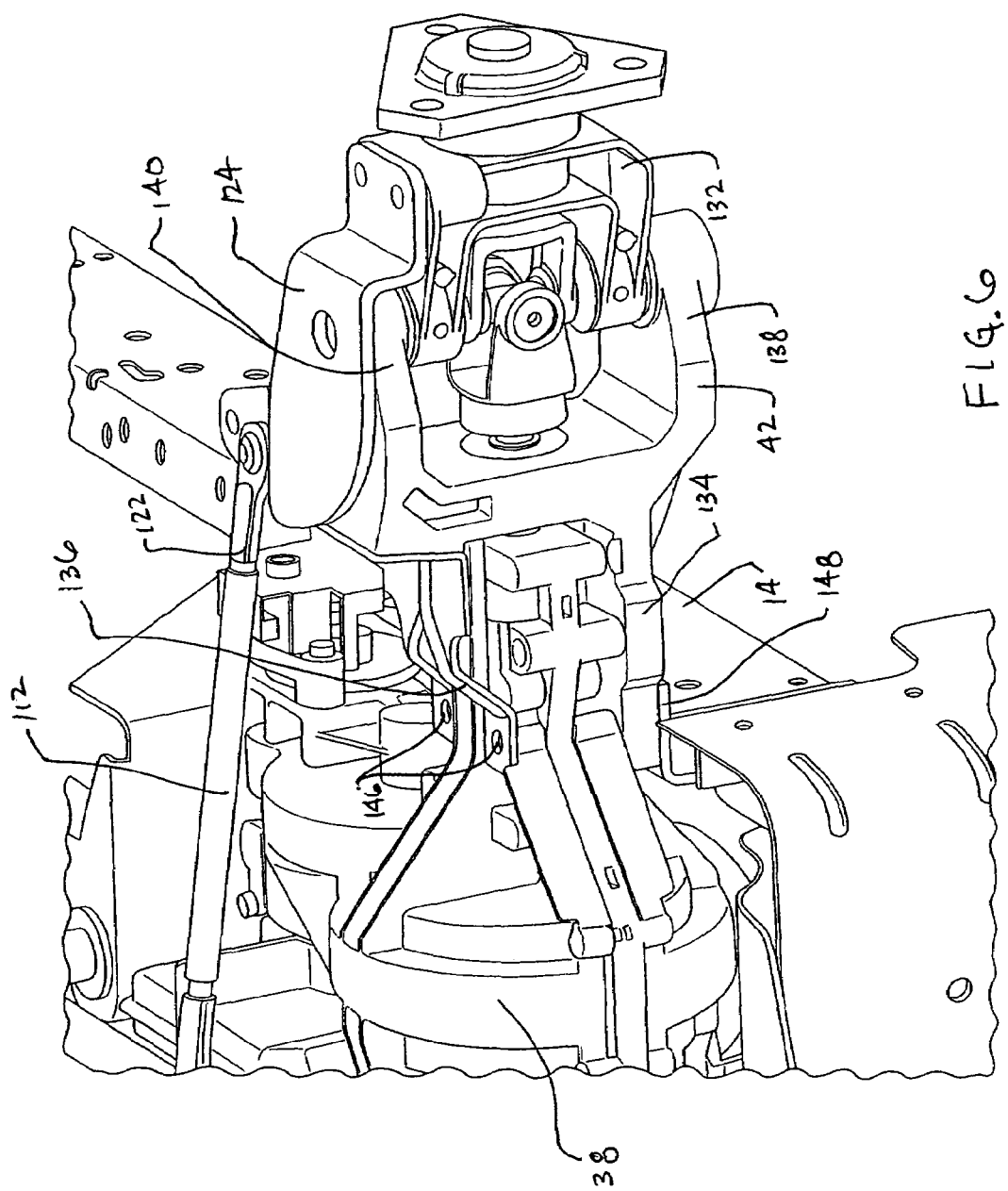
FIG. 6 is an enlarged rear-side-bottom perspective view of the rear pivot bracket shown in FIG. 4.

As shown in FIGS. 4-6, an intermediate portion of the first rear steering arm 118 is pivotally mounted to an outer surface of the first rear pivot bracket 40, and an intermediate portion of the second rear steering arm 124 is pivotally mounted to an outer surface of the second rear pivot bracket 42. One end of the first rear steering arm 118 is pivotally connected to the second end 116 of the first connecting link 110, and the opposite end of the first rear steering arm 118 is rigidly connected to the first pivot assembly 130 structured to mount the first rear wheel assembly 24. Similarly, one end of the second rear steering arm 124 is pivotally connected to the second end 122 of the second connecting link 112, and the opposite end of the second rear steering arm 124 is rigidly connected to the second pivot assembly 132 structured to mount the second rear wheel assembly 26. Thus, movement of the first and second connecting links 110, 112 causes pivotal movement of the first and second rear steering arms 118, 124, which causes pivotal movement of the pivot assemblies 130, 132 associated with the first and second rear wheel assemblies 24, 26 to turn the first and second rear wheels 126, 128.

Figure 7:
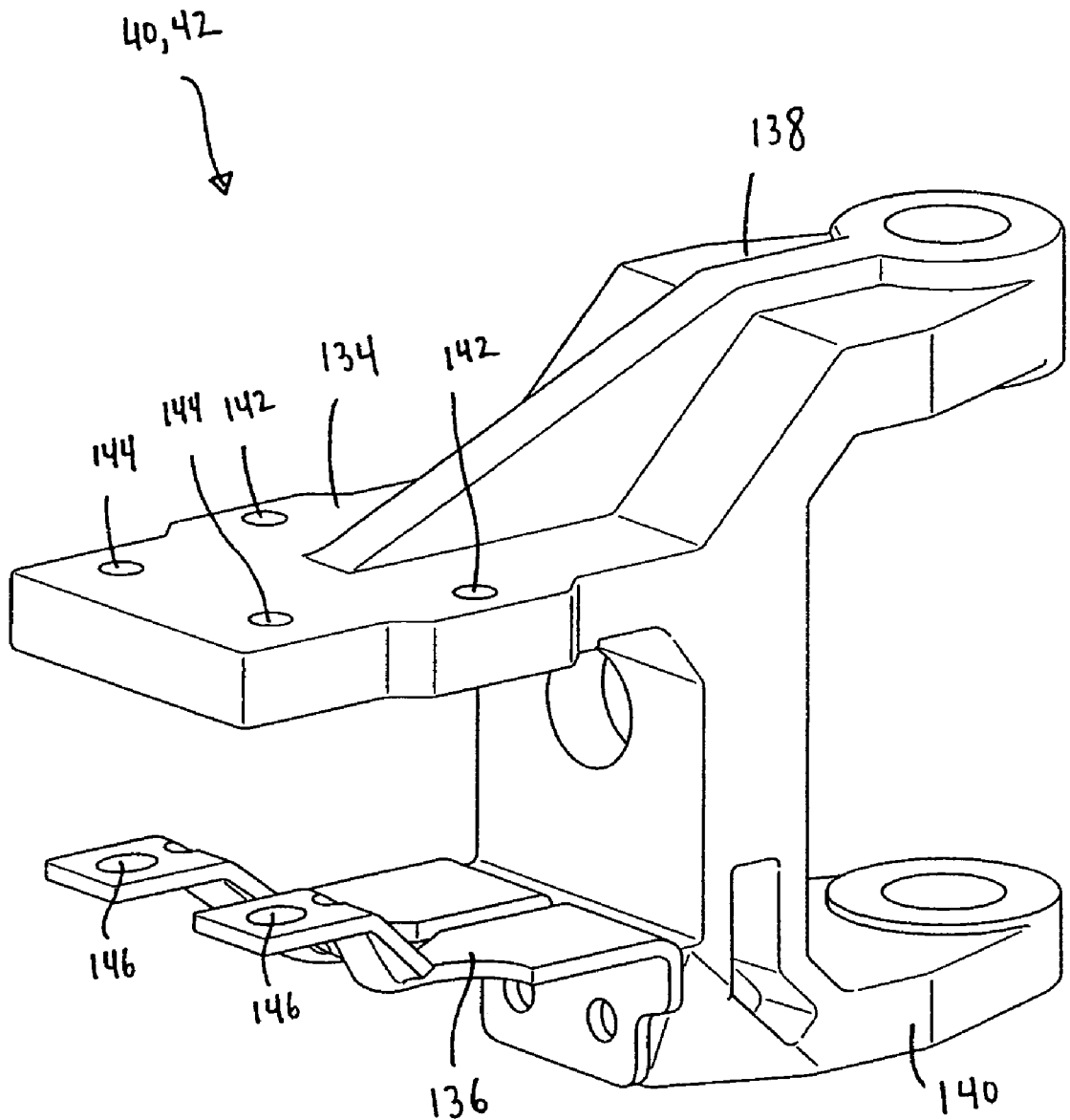
FIG. 7 is an isolated, front-side-top perspective view of the rear pivot bracket shown in FIG. 4.

As shown in FIG. 7, each of the first and second rear pivot brackets 40, 42 (also referred to as inner pivot brackets) provide upper and lower mounting flanges 134, 136 and upper and lower support flanges 138, 140. The upper mounting flange 134 provides an inner pair of openings 142 and an outer pair of openings 144. The lower mounting flange 136 provides a pair of openings 146. Each of the rear pivot brackets 40, 42 may be constructed as a one-piece structure, e.g., molding, and may be constructed of any suitable material, e.g., aluminum. However, each of the rear pivot brackets 40, 42 may include separate portions constructed separately from one another and then rigidly connected to one another in any suitable manner. The upper and lower mounting flanges 134, 136 of each rear pivot bracket 40, 42 are mounted to a respective side of the rear transaxle 38.

Specifically, as best shown in FIG. 5, the sides of the rear transaxle 38 extend between the upper and lower mounting flanges 134, 136 of a respective rear pivot bracket 40, 42. Fasteners (not shown) extend through the inner and outer pairs of openings 142, 144 of the upper mounting flange 134 and into corresponding openings provided in the rear transaxle 38, and fasteners (not shown) extend through the pair of openings 146 of the lower mounting flange 136 and into corresponding openings in the rear transaxle 38 to fixedly secure the respective rear pivot bracket 40, 42 to the rear transaxle 38. Moreover, a bracket 148 is mounted between the frame 14 and the outer pairs of openings 144 of the upper mounting flange 134, e.g., by fasteners, to fixedly secure the respective rear pivot bracket 40, 42 to the frame 14. Thus, each rear pivot bracket 40, 42 is mounted to both the rear transaxle 38 and the frame 14. This mounting arrangement maintains a more precise relationship between the respective rear pivot bracket 40, 42 and the rear transaxle 38.

The mating surfaces between each rear pivot bracket 40, 42 and the transaxle 38 may include machined finishes. Also, each rear pivot bracket 40, 42 may be secured to the rear transaxle 38 and frame 14 in any suitable manner, e.g., fasteners, welding, etc.

The upper and lower support flanges 138, 140 are structured to pivotally support a respective pivot assembly 130, 132 associated with the rear wheel assemblies 24, 26. Axle shafts of the rear transaxle 38 extend through openings in respective rear pivot brackets 40, 42 and into engagement with respective pivot assemblies 130, 132.

Operation of the four-wheel steering assembly 10 will now be described in greater detail. In an initial straight-line travel position (as shown in FIG. 1), the rear steering link 52 is positioned such that the cam-guided first end 78 of the rear steering link 52 is positioned at an intermediate portion of the arcuate slot 76 of the cam slot bracket 50. Left-hand rotation of the steering wheel by the operator rotates the gear 44 in a counter-clockwise direction (as viewed in FIG. 1), which causes corresponding movement of the first and second front links 46, 48 to turn the first and second front wheels 58, 60 to the right (as viewed in FIG. 1). Left-hand rotation of the steering wheel by the operator also causes the rear steering link 52 to move via the cam slot bracket 50, which pivots the rear pivot lever 82 and the L-shaped rear link 100 in a counter-clockwise direction (as viewed in FIG. 1), which in turn causes corresponding movement of the first and second connecting links 110, 112 to turn the first and second rear wheels 126, 128 to the left (as viewed in FIG. 1).

Similarly, right-hand rotation of the steering wheel by the operator rotates the gear 44 in a clockwise direction (as viewed in FIG. 1), which causes corresponding movement of the first and second front links 46, 48 to turn the first and second front wheels 58, 60 to the left (as viewed in FIG. 1). Right-hand rotation of the steering wheel by the operator also causes the rear steering link 52 to move via the cam slot bracket 50, which pivots the rear pivot lever 82 and the L-shaped rear link 100 in a clockwise direction (as viewed in FIG. 1), which in turn causes corresponding movement of the first and second connecting links 110, 112 to turn the first and second rear wheels 126, 128 to the right (as viewed in FIG. 1).

Thus, the rear wheels 126, 128 are turned in a direction that is opposite to the direction in which the front wheels 58, 60 are turned, which decreases the turning radius of the vehicle 12 to increase maneuverability. Moreover, the arcuate slot 76 of the cam slot bracket 50 is structured such that steering of the rear wheels 126, 128 is delayed with respect to steering of the front wheels 58, 60. This "dwell" feature allows the front wheels 58, 60 to turn before the rear wheels 126, 128 start to turn, which allows the vehicle 12 to turn away from close obstacles, for example.

The "dwell" feature of the steering assembly 10 is similar to the systems disclosed in U.S. Pat. Nos. 5,048,853 and 5,288,091, the entireties of both being incorporated herein by reference.

The foregoing embodiments have been provided to illustrate the structural and functional principles of the present invention, and are not intended to be limiting. To the contrary, the present invention is intended to encompass all modifications, alterations and substitutions within the spirit and scope of the appended claims.

What is claimed is:

1. A steering assembly for a vehicle, comprising:
   a forward apparatus positioned toward the front of the vehicle and having a first front wheel assembly and a second front wheel assembly;
   a gear having teeth and being pivotable about a pivot axis, said pivot axis being positioned between said teeth of said gear and said forward apparatus;
   a first front link directly attached to said gear and connected to said first front wheel assembly to turn a first front wheel; and
   a second front link directly attached to said gear and connected to said second front wheel assembly to turn a second front wheel.

2. A steering assembly according to claim 1, further comprising:
   a rearward apparatus coupled to said gear and having a first rear wheel assembly and a second rear wheel assembly.

3. A steering assembly according to claim 1, wherein said gear is a sector gear having said teeth on one side of said gear and said pivot axis is located on another side of said gear that is opposite to said one side of said gear.

4. A steering assembly according to claim 3, further comprising:
   a cam slot bracket coupled to said gear.

5. A steering assembly according to claim 4, further comprising:
   a rear steering link coupled between said cam slot bracket and a rearward apparatus, and said rearward apparatus having a first rear wheel assembly and a second rear wheel assembly.

6. A steering assembly according to claim 5, wherein the vehicle has a frame, the steering assembly, further comprising:
   a rear transaxle;
   a bracket that is coupled to said frame and that is positioned between said rear transaxle and said gear; and
   a rear pivot lever mounted on said bracket and being coupled to said rear steering link and to said first and second rear wheel assemblies to turn a first rear wheel and a second rear wheel.

7. A steering assembly according to claim 1, wherein said first front link has a first end pivotally connected to said gear and a second end pivotally connected to said first front wheel assembly, and said second front link has a first end pivotally connected to said gear and a second end pivotally connected to said second front wheel assembly.

8. A four-wheel steering assembly for a vehicle, comprising:
a forward apparatus positioned toward the front of the vehicle and having a first front wheel assembly and a second front wheel assembly;
a rearward apparatus positioned toward the rear of the vehicle and having a first rear wheel assembly and a second rear wheel assembly;
a sector gear positioned between said forward and rearward apparatus, said sector gear having teeth on one side of said gear and a pivot axis located on another side of said gear that is opposite to said one side of said gear, said sector gear being pivotable about said pivot axis, said pivot axis being positioned between said teeth of said sector gear and said forward apparatus;
a first front link directly attached to said sector gear and connected to said first front wheel assembly to turn a first front wheel;
a second front link directly attached to said sector gear and connected to said second front wheel assembly to turn a second front wheel; and
a rear steering link coupled between said sector gear and said rearward apparatus to turn a first rear wheel and a second rear wheel.

9. A four-wheel steering assembly according to claim 8, further comprising:
a cam slot bracket coupled to said sector gear.

10. A four-wheel steering assembly according to claim 9, wherein:
said rear steering link is coupled between said cam slot bracket and said rearward apparatus.

11. A four-wheel steering assembly according to claim 9, wherein the cam slot bracket includes a non-linear cam slot adapted to turn the first rear wheel and the second rear wheel an amount that varies with respect to the amount of pivot of the sector gear.

12. A four-wheel steering assembly according to claim 8, further comprising:
a rear transaxle;
a bracket coupled to a frame of the vehicle and being positioned between said rear transaxle and said sector gear; and
a rear pivot lever mounted on said bracket and being coupled to said rear steering link and to said first and second rear wheel assemblies to turn the first rear wheel and the second rear wheel.

13. A four-wheel steering assembly for a vehicle, comprising:
a forward apparatus positioned toward the front of the vehicle and having a first front wheel assembly and a second front wheel assembly;
a rearward apparatus positioned toward the rear of the vehicle and having a first rear wheel assembly and a second rear wheel assembly;
a sector gear positioned between said forward and rearward apparatus, said sector gear having teeth on one side of said gear and a pivot axis located on another side of said gear that is opposite to said one side of said gear, said pivot axis being positioned between said teeth of said sector gear and said forward apparatus, said sector gear being pivotable about said pivot axis;
a first front link directly attached to said sector gear and connected to said forward apparatus;

a rear steering link coupled between said sector gear and said rearward apparatus to turn a first rear wheel and a second rear wheel;
a bracket rigidly attached to a frame of the vehicle and being positioned between said rearward apparatus and said sector gear; and
a rear pivot lever mounted on said bracket and being coupled to said rear steering link and to said first and second rear wheel assemblies to turn the first rear wheel and the second rear wheel.

14. A four-wheel steering assembly according to claim 13, further comprising:
a rear transaxle, and said bracket is positioned between said rear transaxle and said sector gear and separate from said rear transaxle.

15. A four-wheel steering assembly according to claim 14, further comprising:
a cam slot bracket coupled to said sector gear.

16. A four-wheel steering assembly according to claim 15, wherein said rear steering link is coupled between said cam slot bracket and said rear pivot lever.

17. A four-wheel steering assembly according to claim 13, wherein said pivot axis of said sector gear is positioned between said teeth of said sector gear and said rearward apparatus.

18. A four-wheel steering assembly according to claim 13, wherein said first front link is attached to said sector gear and to said first front wheel assembly to turn said first front wheel, and a second front link is attached to said sector gear and to said second front wheel assembly to turn said second front wheel.

19. A four-wheel steering assembly for a vehicle, comprising:
a forward apparatus positioned toward the front of the vehicle and having a first front wheel assembly and a second front wheel assembly;
a rearward apparatus positioned toward the rear of the vehicle and having a first rear wheel assembly and a second rear wheel assembly;
a gear positioned between said forward and rearward apparatuses, said gear having teeth and being pivotable about a pivot axis, said teeth being positioned between said pivot axis of said gear and said rearward apparatus;
a first front link directly attached to said gear and connected to said forward apparatus; and
a rear steering link coupled between said gear and said rearward apparatus to turn a first rear wheel and a second rear wheel;
steering arms associated with said rear steering link;
a rear transaxle;
a first rear pivot bracket rigidly attached to a frame of the vehicle and the rear transaxle; and
a second rear pivot bracket rigidly attached to the frame of the vehicle and the rear transaxle;
said first and second rear pivot brackets structured to pivotally support respective pivot assemblies associated with said first and second rear wheel assemblies.

20. A four-wheel steering assembly according to claim 19, wherein
said first front link is attached to said gear and to said first front wheel assembly to turn a first front wheel, and
a second front link is attached to said gear and to said second front wheel assembly to turn a second front wheel.

* * * * *